United States Patent [19]

Hull et al.

[11] Patent Number: 5,387,001
[45] Date of Patent: Feb. 7, 1995

[54] COMBINATION VEHICLE TOWING DOLLY AND FLATBED TRAILER

[76] Inventors: Harold L. Hull, 401 Canyon Way #43, Sparks, Nev. 89434; Jacques L. Cote; Robert B. Shelley, both of Box 10049, Zephyr Cove, Nev. 89448

[21] Appl. No.: 991,854

[22] Filed: Dec. 14, 1992

[51] Int. Cl.⁶ .......................... B60P 1/28; B60P 3/077
[52] U.S. Cl. ................................. 280/402; 280/415.1; 280/482; 280/491.2; 280/656; 414/430; 414/537
[58] Field of Search .............. 280/401, 402, 415.1, 280/462, 482, 491.1, 491.2, 40, 656, 79.7, 789, 414.1, 491.3, 43.16, 64; 414/428, 430, 537, 563

[56] References Cited

U.S. PATENT DOCUMENTS

| | | | |
|---|---|---|---|
| 2,327,308 | 8/1943 | Johnston | 280/482 |
| 3,083,986 | 4/1963 | Moody et al. | 280/414.1 |
| 3,311,245 | 3/1967 | Galey | 414/537 |
| 3,758,135 | 9/1973 | Kniff | 414/563 |
| 3,896,949 | 7/1975 | Shipley | 214/86 A |
| 4,445,665 | 5/1984 | Cray | 254/88 |
| 4,664,399 | 5/1987 | Mobley | 280/43.17 |
| 4,671,530 | 6/1987 | van der Wouden | 280/656 |
| 4,778,333 | 10/1988 | Youmans | 414/563 |
| 4,859,134 | 8/1989 | Lock | 414/563 |
| 4,890,852 | 1/1990 | Chapman | 280/402 |
| 4,901,980 | 2/1990 | Hansen | 254/9 C |
| 4,921,390 | 5/1990 | Baines | 414/483 |
| 5,016,897 | 5/1991 | Kauffman | 280/482 |
| 5,064,078 | 11/1991 | Van Staveren | 212/180 |

FOREIGN PATENT DOCUMENTS

| | | | |
|---|---|---|---|
| 2383805 | 11/1978 | France | 280/414.1 |
| 0656356 | 6/1986 | Switzerland | 414/563 |
| 7837340 | 8/1980 | United Kingdom | 280/414.1 |
| 1602285 | 11/1981 | United Kingdom | 280/656 |

*Primary Examiner*—Eric D. Culbreth
*Assistant Examiner*—Anne Marie Boehler

[57] ABSTRACT

Disclosed is a towing aid which may be easily assembled for multiple uses and disassembled for shipment, storage or transport and includes a variable width axle and a tongue with a variable height for the tongue hitch to accommodate various heights of vehicle hitches. In one assembly the towing aid becomes a car dolly with variable widths between the wheel wells and ramps which are mounted on a rotatable I shaped frame pivotal to and supported by the variable width axle. In a second assembly the I shaped frame is removed and a flatbed trailer frame is attached to the axle. Each part is removably affixed to other parts and disassembles into a compact kit.

15 Claims, 4 Drawing Sheets

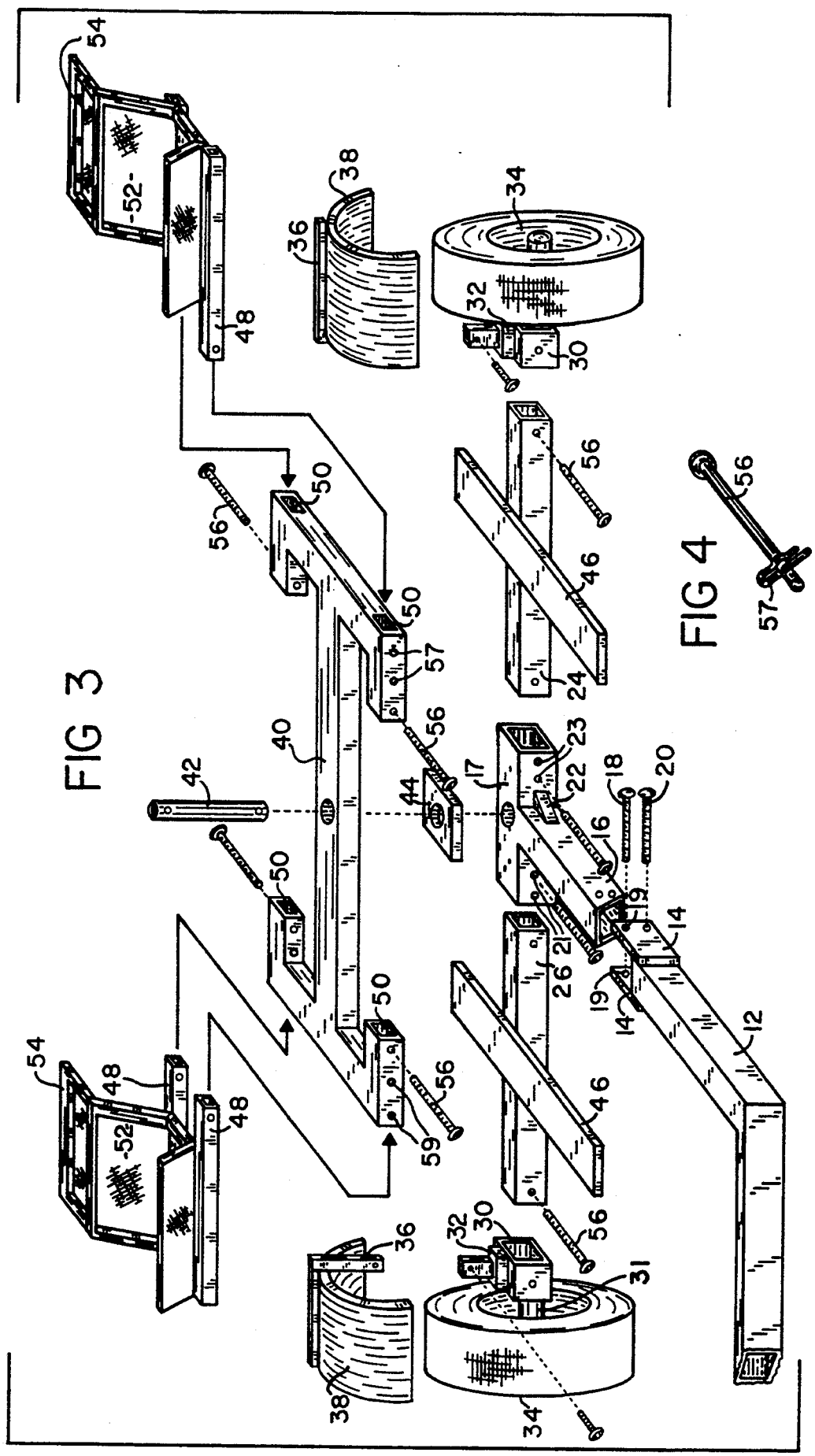

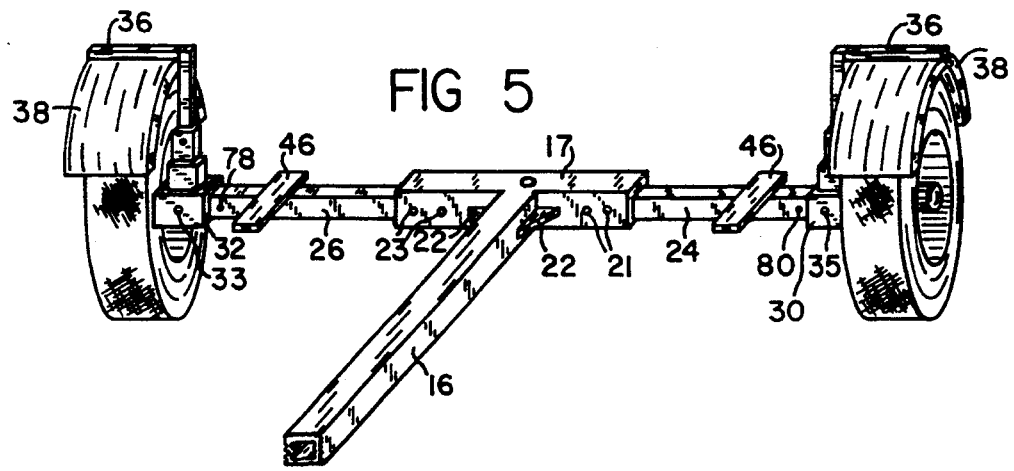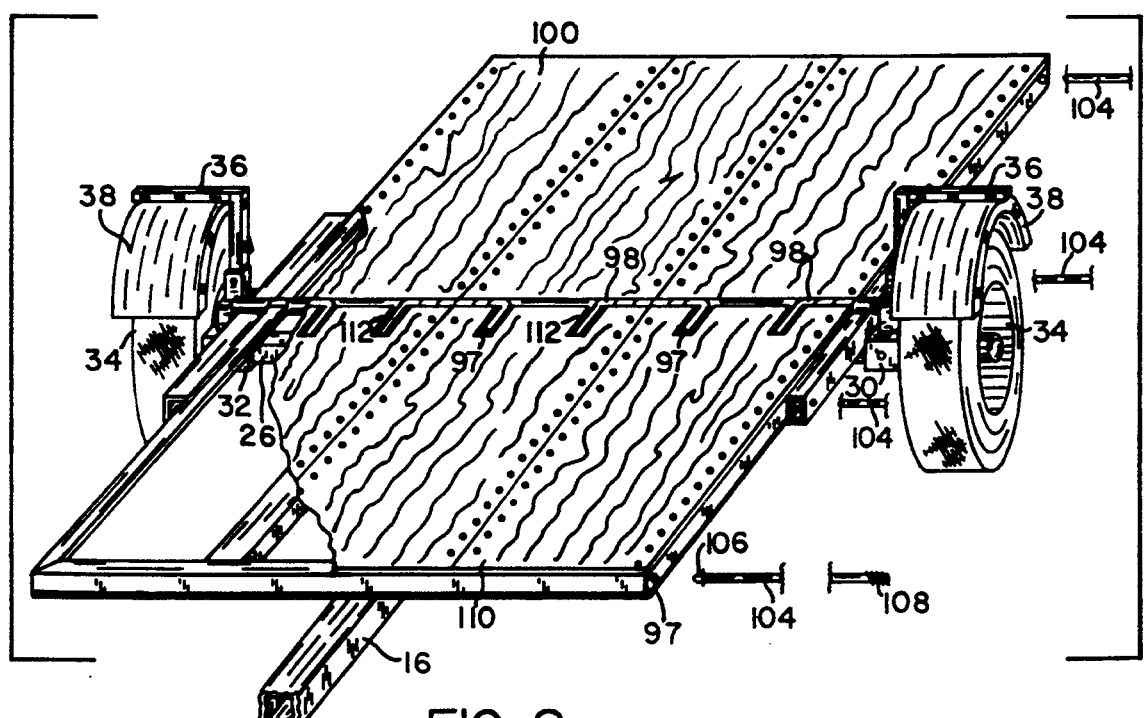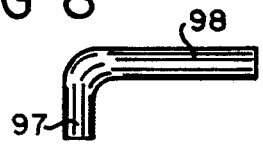

COMBINATION VEHICLE TOWING DOLLY AND FLATBED TRAILER

FIELD OF THE INVENTION

This invention relates to towing aids and more particularly to a towing aid associated with towing vehicles such as an automobile.

BACKGROUND OF THE INVENTION

In the past, a number of towing "dolly's" for use in towing a vehicle behind another vehicle such as a motorhome are disclosed such as U.S. Pat. No. 4,890,852 which teaches a long trailer like apparatus which reaches substantially to the rear of the towed vehicle and two cables are hooked on the under-carriage of the rear of the towed vehicle and then winched upward through the use of a conventional crank. Also, U.S. Pat. No. 4,921,390 teaches a towing dolly which includes a rotatable support frame upon which the wheels of the towed vehicle are directly supported but must also be winched upward.

The cited references are only examples of the problems associated with towing dolly's and many other attempts have been made such as towing bars, trailers, etc.

The prior art, while teaching towing dolly's and the like, does not disclose a multipurpose dolly which may be used for other purposes other than a dolly such as a flat bed trailer and which may also be assembled and disassembled for easy transport when not in use as a dolly or when the dolly is stored.

SUMMARY OF THE INVENTION

It is therefore, a primary object to provide a towing dolly which may be easily assembled or disassembled.

It is another object to provide an axle and wheels which, when assembled, provides a base to which other functional devices may be adapted.

Another important object is to provide means to selectively vary the distance between the wheels.

It is yet another object to provide a towing tongue which is removably affixed to the axle and having a suitable attaching means at its distal end such as a trailer hitch of engineering choice.

Yet another important object is to provide the towing tongue with means to lock and unlock or buckle substantially in its center section to form a first and second position.

Another object is to provide a means to adjust the height of the trailer hitch in relation to a towing vehicle.

Still another important object is to provide a pivotable turntable like assembly relative to the axle which is removably affixed at its center to the axle by a pin and supported on its extreme ends to the axle by means which allow the turntable to turn relative to the axle.

Yet another important object is to provide a pair of wheel wells which are removably affixed to and supported by the turntable.

It is yet another object to provide means to selectively vary the distance between the removably affixed wheel wells to accommodate different widths of the wheel base of the vehicle.

Another object is to provide as part of the wheel wells, a pair of ramps which allows a vehicle to be driven upon when the tow bar is in its second position which is a position with one end of the ramps on the ground.

Still another object is to provide wheel fenders which are removably affixed to the axle and which substantially covers the top portion of the dolly wheels.

Another important object is to provide a frame which may be assembled to and supported by, the axle instead of the turntable to form a flatbed trailer.

Other objects and advantages will become apparent when taken into consideration with the following specifications and drawings.

BRIEF DESCRIPTION OF THE DRAWINGS

FIG. 3, is an exploded perspective view of the preferred embodiment.

FIG. 4, is a perspective view of a fastening means such as a pin.

FIG. 5, is a perspective view of the preferred embodiment showing only the axle and wheel assembly.

FIG. 7, is a perspective view of a flat-bed trailer.

FIG. 8, is a side view of a hinge-pin.

DETAILED DESCRIPTION OF THE DRAWINGS

Figure 1:
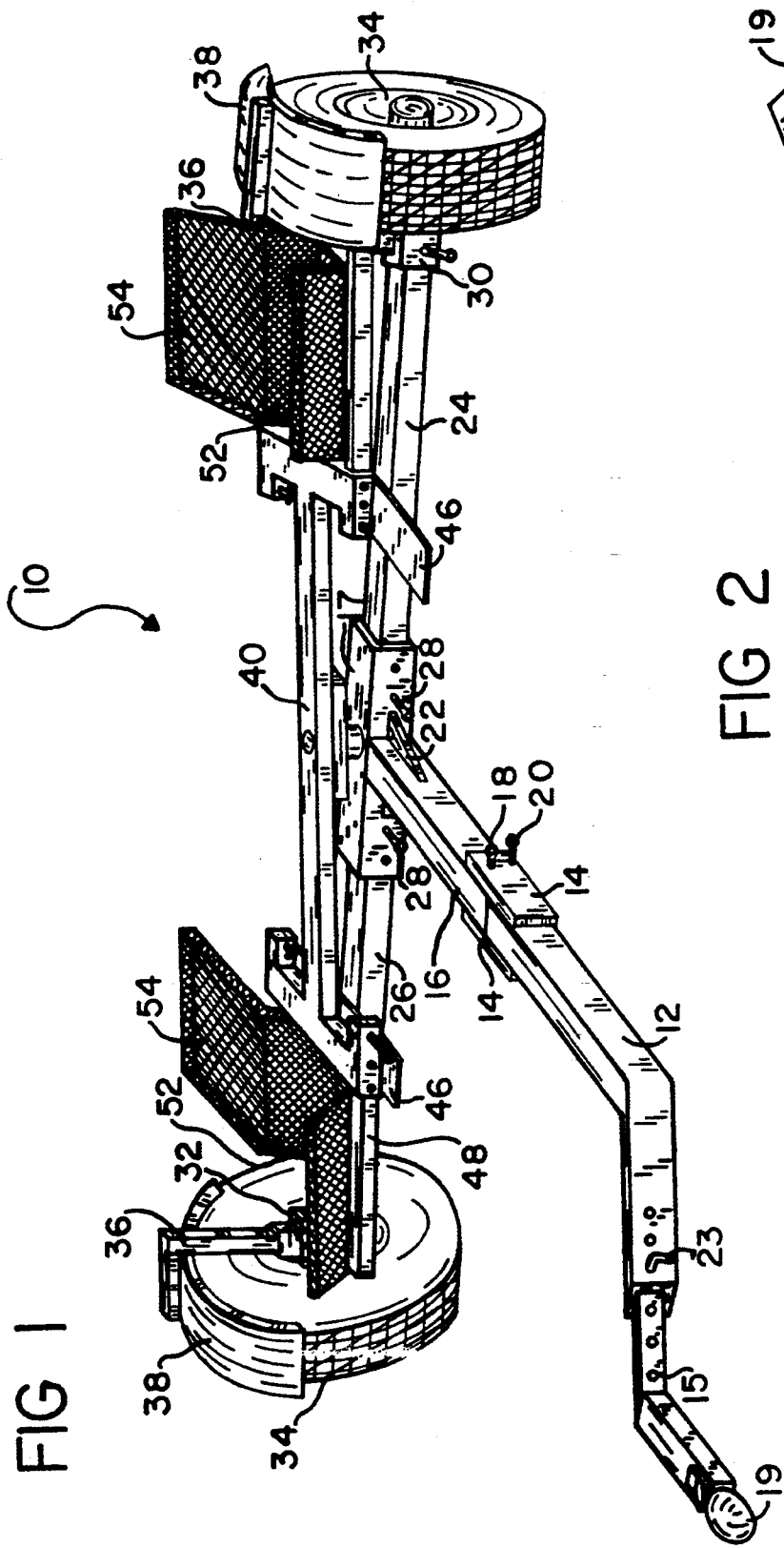
FIG. 1, is a perspective view of the preferred embodiment.
Figure 2:
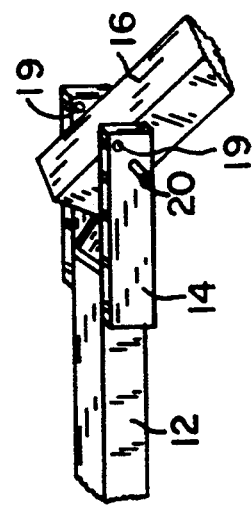
FIG. 2, is a side view of a working joint of the tongue in a second position.

Referring now in detail to the drawings wherein like characters refer to like elements throughout the various drawings, in FIG. 1, 10 is an overview of the preferred embodiment showing our new invention in an assembled form with 12 being a second section of a tongue with side plates 14 affixed in place by means such as welding while 16 is a first section of the tongue having a cross member 17 and is pinned by removable pins 18 and 20, respectively, to the second section 12 when the tongue is in a first closed and locked position, however, when the pin 18 is removed from holes 19, the second pin 20 becomes a hinge member and allows the tongue 12 to assume a second un-locked position as shown in FIG. 2. 15 is a third section of the tongue slidably engaged with section 12 to provide multiple locking positions to allow height adjustment to a towing vehicle (not shown) with hitch member 19 and locking pin 23. The first, second and third sections of the tongue, 12, 15 and 16, respectively, are preferably made of square metal tubing with the second section 16 having its cross member 17 suitably affixed to section 16 by means such as welding and supported by gussets 22. 24 and 26, respectively, are elongated square tubular members having a sliding relationship with the cross section 17 and are selectively pinned in place by removable pins 28 while the distal ends of the members 24 and 26, respectively, cooperate with a first pair of square tubular removably affixed wheel mounts 30 and 32, respectively, which supports axles 31 and wheel hub and bearings (not shown) to support wheels 34. Wheel mounts 30 and 32, respectively, also removable support means 36 which in turn support wheel fenders 38.

In FIG. 3, 40 is substantially an I-shaped member which may be made of rectangular tubular metal and is pivotably mounted to substantially the center portion of the cross member 17 of tongue section 16 by suitable means such as pin 42 and 44 being a spacer to allow clearance between I-shaped member 40 and the cross member 17, with 46 being elongated flat support members to allow I-shaped member 40 to slidably engage the support members 46, members 46 being suitably secured to the elongated square tubular members 24 and 26, respectively, by means such as welding and members 46 may be covered by a wear resistant surface (not shown) such as plastic or the like.

The I-shaped member 40 serves as a support for removably affixing support members 48, 48 being square or rectangular tubular members which cooperate and have a sliding relationship with I-shaped member 40 and are selectively pinned in place to member 40 through multiple holes 57 and 59, respectively, thru cavities 50, 48 being supports for wheel wells 52 and ramps 54, ramps 54 being supported by the ground surface (not shown) when the tongue sections 12 and 16 are in their second position.

The various removable members such as elongated square tubular members 24 and 26, tongue sections 12, 15 and 16, I-shaped member 40, support members 48, and fender support members 36 may be assembled and held in place by a number of different fastening means, such as bolts and nuts (not shown), the preferred embodiment being the pin 56 and keeper 57 as shown in FIG. 4, for easy assembly and disassembly.

In FIG. 5, we show the trailer tongue section 16 and cross section 17 with elongated square tubular members 24 and 26 in place ready to be selectively pinned to the elongated square tubular members through multiple holes 21 and 23, respectively and wheel mounts 30 and 32, respectively, in place ready to be pinned through holes 33 and 35, respectively.

Figure 6:
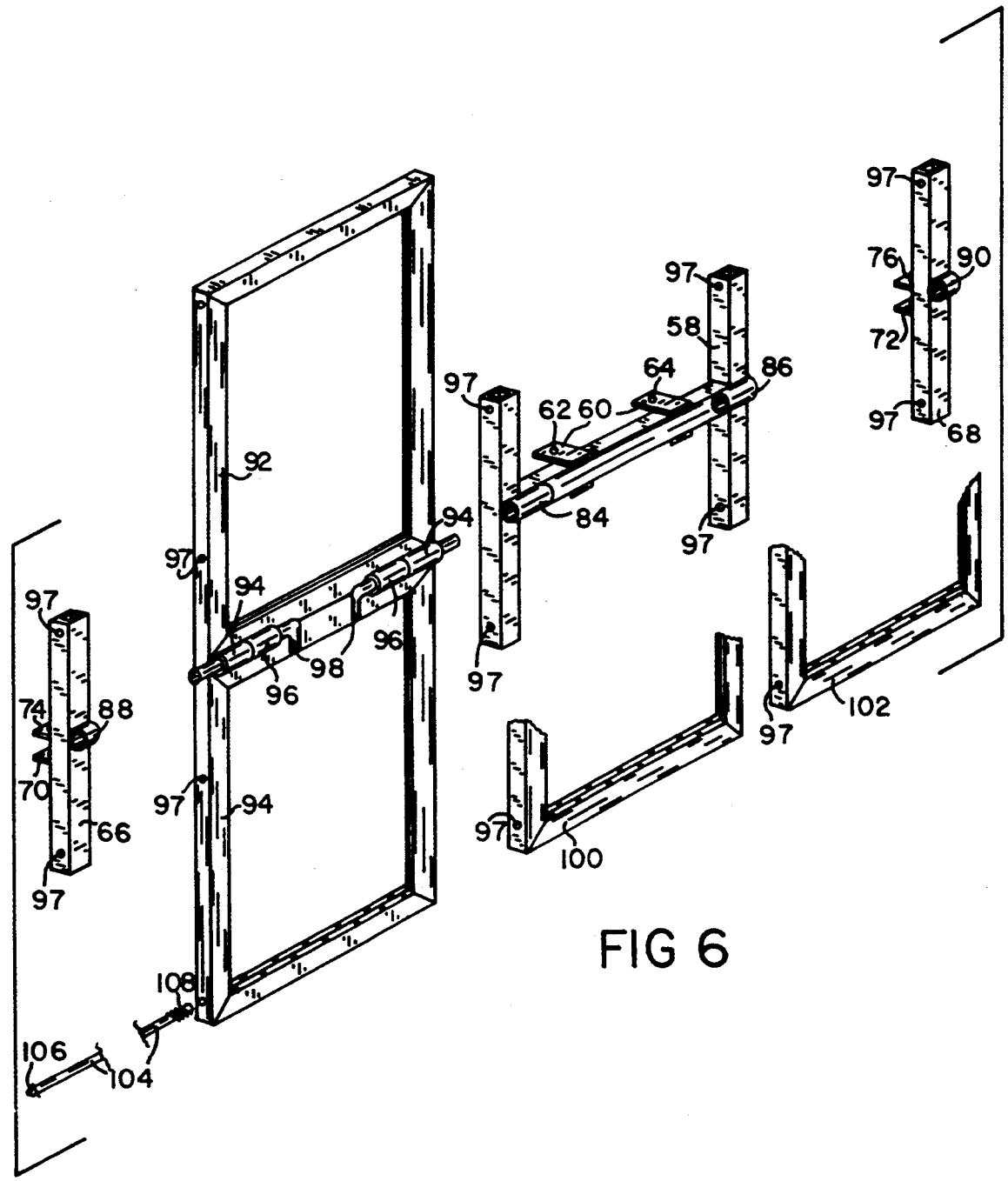
FIG. 6, is a perspective view of the frame construction of a second embodiment forming a flat-bed trailer.

In FIG. 6, we show the various structures of a framework which may now be added to the towing aid of FIG. 5 to form a flat bed trailer with substantially an H-shaped center frame 58 with mounting brackets 60 suitably affixed such as by welding to the H-frame 58 with the holes 62 and 64 matching up with a pair of matching holes 21 and 23, respectively, with tubular members 66 and 68, respectively, having mounting brackets 70 and 72, respectively, suitably affixed such as by welding with holes 74 and 76, respectively, matching up with holes 78 and 80 respectively, as shown more clearly in FIG. 5.

The H-frame 58 also has suitably affixed to it, such as by welding, sections of a hinge member 84 and 86, respectively, outer tubular support members 66 and 68 respectively, also having hinge members 88 and 90, respectively, suitably affixed such as by welding.

92 and 94 are rectangular frames hinged together at one of their ends by hinge members 94 and 96, forming multiple pairs respectively, and hinge pins 98 with the ends of the hinge pin 98 protruding to mate with hinge members 88 and 90, respectively, of tubular member 66 and 68, respectively. 100 and 102 are similar frames to 94 forming a deck (upper sections not shown) which complete the framework for the bed of the trailer. 104 is a long rod, preferably steel, with a head 106 such as an axle nut on one end and threads 108 on its distal end to accept a nut (not shown). Four of these long rods 104 as shown in FIG. 7, connect the six frames 92, 94, 100, 102 and two top frames (not shown in FIG. 6 but represented in FIG. 7) together and through multiple holes 97 in tubular members 66, 68 and H-member 58, thus removably affixing all the frames and their support members, to the tubular members 24 and 26 of the trailer depicted in FIG. 5.

FIG. 7, shows the panels being covered by a material such as ply-board 110 and shows the multiple hinge pins 98 as shown in FIG. 8, with their right angle handles 97 being recessed into notches 112 of ply-board 110.

It will now be seen that we have disclosed a combination towing dolly and flat bed trailer which may be easily assembled or disassembled.

It will also be noted that we have provided a wheel and axle base to which other functional devices may be adapted.

Another important feature disclosed is a tongue with a first and second position to allow the back of the ramps, or in a second embodiment, the back of the trailer to engage with the surface of the ground.

We have also provided an I-shaped member which supports wheel wells and ramps to enable the trailer to perform as a car dolly.

Yet another feature is a hitch which may have multiple positions to allow height adjustment to conform to the proper height of the hitch member of a towing vehicle.

We have also provided means to selectively vary the distance between the ground wheels of the towing aid.

We have also provided means to selectively vary the distance between the wheel wells to accommodate different widths of the wheel base of various towed vehicles.

Still another feature is a removably affixed frame work which when covered with a suitable material such as ply-board becomes a flat bed trailer.

Although the invention has been shown and described in what is conceived to be the most practical and preferred embodiment, it is recognized that departures may be made therefrom within the scope and spirit of the invention, which is not limited to the details disclosed herein but is to be accorded the full scope of the claims so as to embrace any and all equivalent devices and apparatus.

Having described our invention, what we claim as new and desire to secure by letters patent is:

1. A towing aid for wheeled vehicles comprising: a pair of ground engaging wheels rotatably supported by a pair of independent axles, said axles being fixed to a first pair of square tubular wheel mounts, a second pair of elongated square tubular wheel mounts, an elongated square tubular tongue having first, second and third sections, said first and second sections of said tongue being interconnected by hinge means, said first section of said tongue having an elongated square tubular cross member affixed to its distal end forming a T, said second and third sections of said tongue having a sliding relationship, means to removably affix said second and third sections of said tongue together in multiple positions, said third section having at its distal end a means for hitching the towing aid to a wheeled vehicle, said second pair of elongated tubular members having a sliding relationship with said cross member, means to removably affix said second pair of elongated square tubular members in multiple positions to said cross member, and means to removably affix each of said second pair of independent elongated square tubular members to a respective one of said wheel mounts, a substantially I shaped member, said I shaped member being formed of multiple square sectioned tubular members having means for removably and pivotally mounting said I shaped member to said cross member, a pair of wheel wells, said pair of wheel wells each having a ramp at one of its ends, said pair of wheel wells each being affixed to at least a pair of elongated square tubular support members, said I shaped member having means to removably affix said pairs of support members to outer extremities of said I shaped member in multiple selective positions.

2. The towing aid of claim 1 in which said hinge means between said first and said second sections allows for different positions of said second and said third sections relative to said first section.

3. The towing aid of claim 2 in which said hinge means is a pin.

4. The towing aid of claim 1 in which said means to removably affix said second and third sections of said tongue together in multiple positions is a pin.

5. The towing aid of claim 1 in which said means to removably affix said second pair of elongated square tubular members in multiple positions to said cross member is by multiple holes and a holding pin.

6. The towing aid of claim 1 in which said first pair of square tubular wheel mounts include removable support means to support a pair of wheel fenders.

7. The towing aid of claim 1 in which said means to removably affix said pairs of support members to outer extremities of said I shaped member in multiple selective positions are cavities being of a size and shape to accept said support members, said outer extremities and said support members having multiple mating holes to accept a holding pin.

8. The towing aid of claim 1 including a pair of elongated flat support members, means to affix said flat support members transversely to said second pair of elongated square tubular members, said flat support members having a supporting sliding working relationship with said square tubular members of said I shaped member.

9. A towing aid for wheeled vehicles comprising: a pair of ground engaging wheels rotatably supported by a pair of independent axles, said axles being fixed to a first pair of square tubular wheel mounts, a second pair of elongated square tubular members, an elongated square tubular tongue having a first and second end, said first end of said tongue having means for hitching the towing aid to a wheeled vehicle, said second end of said tongue being fixed to an elongated square tubular cross member forming a T, said second pair of elongated tubular members having a sliding relationship with said cross member, means to removably affix said second pair of elongated square tubular members in multiple positions to said cross member, means to removably affix each of said second pair of independent elongated square tubular members to a respective one of said wheel mounts, a flatbed frame structure, said flatbed frame structure being removably mounted to said towing aid, a substantially H shaped mounting frame, said H shaped frame having removable mounting means to affix said H frame to said elongated square tubular cross member, said flatbed frame structure including at least two outer elongated square tubular support members, means to removably affix said outer support members to said first pair of square tubular wheel mounts, said flatbed frame structure including multiple elongated rectangular frames, said rectangular frames having hinge means at one of their ends to hinge said rectangular frames together forming multiple pairs, means to removably attach said multiple pairs to said H frame and said outer support members and means to removably attach said multiple pairs of frames together to form said flatbed frame.

10. The towing aid of claim 9 in which said flatbed frame structure includes a deck.

11. The towing aid of claim 9 in which said hinge means are sections of pipe and include a hinge pin.

12. The towing aid of claim 9 in which said means to removably attach said multiple pairs of frames together to form said flatbed frame are multiple rods, said rods having retaining means on their ends, said rods cooperating with multiple transverse holes in said pairs of frames, said H member and said outer support members.

13. The towing aid of claim 9 in which said means to affix said H frame to said elongated square tubular cross member is a mounting bracket and pin.

14. The towing, aid of claim 9 in which said means to removably affix said outer support members to said first pair of square tubular wheel mounts is a bracket.

15. The towing aid of claim 9 in which said means to removably attach said multiple pairs of rectangular frames to said H frame and said outer support members is a bracket and pin.

* * * * *